(12) United States Patent
Schwarze

(10) Patent No.: US 11,381,199 B2
(45) Date of Patent: Jul. 5, 2022

(54) SOLAR ROOF SYSTEM

(71) Applicant: Edelbert Schwarze, Radebeul (DE)

(72) Inventor: Edelbert Schwarze, Radebeul (DE)

( * ) Notice: Subject to any disclaimer, the term of this patent is extended or adjusted under 35 U.S.C. 154(b) by 0 days.

(21) Appl. No.: 17/273,309

(22) PCT Filed: Sep. 9, 2019

(86) PCT No.: PCT/DE2019/100804
§ 371 (c)(1),
(2) Date: Mar. 4, 2021

(87) PCT Pub. No.: WO2020/052711
PCT Pub. Date: Mar. 19, 2020

(65) Prior Publication Data
US 2021/0211086 A1  Jul. 8, 2021

(30) Foreign Application Priority Data

Sep. 11, 2018 (DE) .......................... 102018215445.7
Sep. 11, 2018 (DE) .......................... 102018215446.5

(51) Int. Cl.
*H02S 20/23* (2014.01)
*E04D 3/40* (2006.01)
*E04F 10/00* (2006.01)

(52) U.S. Cl.
CPC ................ *H02S 20/23* (2014.12); *E04D 3/40* (2013.01); *E04F 10/005* (2013.01); *Y02B 10/10* (2013.01); *Y02E 10/47* (2013.01); *Y02E 10/50* (2013.01)

(58) Field of Classification Search
CPC .......... E04D 3/40; E04F 10/005; H02S 20/23; Y02B 10/10; Y02E 10/47; Y02E 10/50
See application file for complete search history.

(56) References Cited

U.S. PATENT DOCUMENTS

| | | | |
|---|---|---|---|
| D468,837 S | * | 1/2003 | Shilling .......................... D25/56 |
| 9,153,718 B2 | * | 10/2015 | Richardson ............. F24S 25/10 |
| 9,302,590 B2 | * | 4/2016 | Santos Silva Serra Duarte .......... H02J 7/0027 |
| 11,047,600 B1 | * | 6/2021 | Lambert ................. F24S 50/20 |

(Continued)

FOREIGN PATENT DOCUMENTS

| AT | 518613 A1 | 11/2017 |
|---|---|---|
| DE | 202009007525 U1 | 9/2009 |

(Continued)

*Primary Examiner* — Jessie T Fonseca
(74) *Attorney, Agent, or Firm* — Michael Soderman

(57) ABSTRACT

The invention relates to a solar roof system (2) comprising: a roof surface (18) having solar panels (20); at least two base support elements (4) for retaining the roof surface (18), wherein each base support element (4) has a main support (6) which is formed by a closed hollow profile which is bent in a bending region (8) by less than 90 degrees and more than 60 degrees, and which has at least one straight first support section (10) connected to the bending region (8), wherein the first support section (10) serves to retain the roof surface (18); at least three framework elements (12, 14, 16, 42) by means of which the first support section (10) is secured down on a bend outer side (17) of the bending region (8) in the intended installed state of the solar roof system (2); and at least two mount adapters (24) assigned to the base support elements (4) for securing the base support elements (4) to a mount (26).

14 Claims, 5 Drawing Sheets

(56) References Cited

U.S. PATENT DOCUMENTS

2015/0333565 A1* 11/2015 Korman ................. B60L 53/20
                                                          320/101
2017/0129356 A1*  5/2017 Johnson ................ B60L 53/53

FOREIGN PATENT DOCUMENTS

DE   102009043779 A1   4/2011
DE   102011118637 A1   5/2013
EP        1933389 A2   6/2008

* cited by examiner

SOLAR ROOF SYSTEM

CROSS REFERENCE TO RELATED APPLICATIONS

This application is the U.S. national stage of International Application No. PCT/DE2019/100804, filed on 2019 Sep. 9. The international application claims the priority of DE 102018215445.7 filed on 2018 Sep. 11 and the priority of DE 102018215446.5 filed on 2018 Sep. 11; all applications are incorporated by reference herein in their entirety.

BACKGROUND

The invention relates to a solar roof system for, for example, a carport roofing.

Solar roofs are regularly formed by multiple solar panels and are used in many areas. In particular, solar roofs often form part of a carport, a shelter for public transport stops, etc., in case the respective solar roof is intended to be a closed roof surface, in particular for rainproof roofing, i.e. if no other closed roof or sealing structure is intended to be present underneath the individual solar panel apart from a supporting structure. Such a carport or such a shelter thus has a sub-construction to which the solar panels are fastened to form the closed roof surface. The solar panels often serve for generating electricity for electrical systems located in the vicinity or directly associated with them, such as parking ticket or ride ticket machines or—of particular interest for promoting electromobility—charging stations for electric vehicles.

DE 10 2009 043 779 A1 shows a steel scaffolding suitable for a photovoltaic system that can be used as a carport. A carport whose solar panel roof can be tilted according to the position of the sun is disclosed in AT 518 613 A1.

For an exhaustive expansion of a charging station network, for example, or at least for an economically attractive establishment and supply of individual charging stations, a cost-effective and, in view of mounting aspects, simple and preferably also lightweight construction is expedient.

SUMMARY

The invention is based on the object of creating a solar roof system which is aesthetically appealing, open on all sides, versatile in use, in particular expandable as desired, and whose mounting should be possible with only a small technical effort, in particular using a minimum number of components.

This object is solved according to the invention by a solar roof system with the features of claim 1. Further advantageous embodiments and further developments of the invention which are partly inventive in themselves are set out in the subclaims and in the following description.

DETAILED DESCRIPTION

The solar roof system according to the invention has a roof surface which has a predetermined number of solar panels. The solar roof system further has at least two base support elements for retaining the roof surface. Each of the base support elements has a main support which is formed from a closed hollow profile, which is bent in a bending region by an angle of at least 60 degrees and at most 90 degrees. Furthermore, the main support has at least one straight support leg adjoining the bending region. This support leg serves for retaining the roof surface. Furthermore, the solar roof system has at least three framework elements by means of which the support leg is secured on a bend outer side of the bending region in the intended installed state of the solar roof system. I.e., the framework elements preferably serve for supporting the main support, and in particular the support leg, against deformation under the load of the roof surface. Furthermore, the solar roof system has at least two foundation adapters associated with the base support elements, which serve for fastening the base support elements to a foundation.

The term "solar roof system" is understood here and in the following to mean both, an independent solar roof for e.g. an individual carport as well as a type of kit by means of which a large-area solar roof arrangement is formed, e.g. over a large parking area.

Preferably, the at least two base support elements are arranged with the bending plane of their respective main supports in parallel to one another. The roof surface is in this case supported on the support legs of the base support elements arranged in parallel to one another. Each of the support legs is herein arranged at an angle greater than 0 degrees and at most 30 degrees to a horizontal line, in particular to the ground. Each of the support legs is secured by means of at least three framework elements on the aforementioned bend outer side of the bending region. One end of each main support, referred to as the "ground end" and opposite of each support leg, is attached to a foundation by means of one of the aforementioned foundation adapters.

The base support elements thus each have a main support that extends in particular from the foundation in particular to a "ridge" (i.e. the highest point of a roof). In order to be able to install an inclined roof surface in the manner of a monopitch roof, advantageously in particular only two base support elements, and optionally also only two foundations, are required. Additional support structures, in particular additional supports, for example forming at the other corners of the roof surface (in particular within the respective bending plane) for supporting this roof surface towards the ground, in particular by means of separate foundations, can be omitted. This makes it possible to install the solar roof system easily and, in particular, quickly.

By the main support forming a preferably integral main element of the respective base support element, a comparatively high stability is also made possible, as due to the curved construction there is a comparatively favourable force distribution as well as a low number of stability-reducing indents compared to a conventional bar framework.

In a preferred embodiment, the solar roof system also has a transverse support which serves for coupling two base support elements each, installed in parallel at right angles to the bending plane of the respective main support. I.e., in the intended installed state of the solar roof system, the two base support elements arranged in parallel to one another with regard to their bending axis are connected transversely to the bending plane by means of this transverse support. In an optional variant, this transverse support is integrally formed by a mounting rail which spans both base support elements arranged in parallel to one another transversely to the main support in order to retain the respective roof surface (specifically its solar panels).

In a preferred design, one of the framework elements is arranged in parallel to the support leg of the respective main support and thereby forms a (longitudinal) support for the respective roof surface. Preferably, this framework element rests on the support leg and overhangs the bending region. In a particularly practical design, this framework element is formed by a U-shaped profile that is placed on the support leg and laterally embraces it, in particular by means of its two parallel U-legs. This is expedient, for example, in the case where the main support is formed by a hollow profile with a circular tubular cross-section. In this case, the corresponding framework element forms a flat bearing for the mounting rail (also called mounting profile) for the individual solar panels or the corresponding roof surface, respectively, with its floor-side leg connecting both parallel U-legs. In the preferred case that this framework element and the main support are formed from metal, they are expediently welded together.

In a further expedient embodiment, the solar roof system has a support and sealing rail for retaining and for sealingly connecting the solar panels, in particular those whose edges lie next to one another in parallel to the bending plane. Preferably, this support and sealing rail also serves for guiding connection cables of the individual solar panels. Preferably, the individual solar panels are fastened by means of this support and sealing rail to the mounting rails described above, which run between two base support elements each. For the sealed connection of the solar panels, in particular for sealing the edges (preferably running in parallel to the bending plane) of the solar panels, a sealing profile of the support and sealing rail is formed as a profile that can be folded along its longitudinal direction around the respective edge, preferably from an elastomer. Preferably, this sealing profile herein has two sealing legs that extend transversely to the longitudinal direction of the sealing profile and are integrally connected to one another via a hinge section. For mounting, the sealing profile is placed around the respective edge of the solar panels so that one sealing leg each lies on the upper and lower sides of the respective solar panel. The solar panels are subsequently inserted into a C-profile-like section of the support and sealing rail. This C-profile-like section forms a receiving groove for the sealing profile with the solar panel received therein.

In a preferred embodiment, the hinge section between the two sealing legs is designed in the manner of a film hinge. I.e., the hinge effect is achieved by a purely elastic deformation of the material of the elastomer sealing profile in the region of this hinge section.

The term "integrally connected" is understood here and in the following to mean in particular that the sealing leg and the hinge section are formed monolithically, i.e. from one and the same material and preferably also in a single, common manufacturing step. For example, the elastomer sealing profile is extruded from an elastomer, in particular a suitable rubber, ethylene-propylene-diene rubber (EPDM), a thermoplastic elastomer (TPE) or the like.

It is recognised that a comparatively large sealing surface is made possible by the fact that, in the intended mounting state, the sealing legs embrace the edge of the solar panel on the upper and lower sides and the end face of the edge is thus also covered by the hinge section. In addition, the fact that the sealing legs are not aligned in parallel to one another in the pre-mounting state, but stand at least V-shaped apart, achieves that mounting of the elastomer sealing profile on the solar panel is comparatively uncomplicated. In particular, in the event that multiple solar panels are to be sealed by means of one and the same sealing profile, these can thus be placed next to one another and with their edge to be sealed flush with one another on one of the both sealing legs and subsequently the second sealing leg can be folded around the edge of all solar panels.

Preferably, a labyrinth seal with at least one trough (i.e. labyrinth chamber) is also formed on at least one of the two sealing legs on a bearing side towards the solar panel. This means that this sealing leg does not lie in with his full area on the solar panel over its entire leg length, but is in contact with the solar panel at at least two points in a sealing direction perpendicular to the longitudinal direction of the elastomer sealing profile and the labyrinth chamber is arranged between these points. Preferably, the sealing leg having the labyrinth seal is the sealing leg that is exposed to the weather in the intended deployment state of the sealing system and is thus arranged in particular on the panel upper side of the solar panels.

In a preferred design, the elastomer sealing profile has a protective body on one of both sealing legs, specifically on the leg that is arranged on a panel upper side of the solar panel (and thus on the side facing the sun in the intended deployment state) in the intended mounting state. This protective body is herein made of a plastic that differs from the elastomer forming the sealing leg. Preferably, this protective body extends over the entire length or surface of the elastomer sealing profile which is exposed to sunlight and also other weather influences in the intended deployment state of the sealing system.

In a preferred design, the plastic of the protective body is formed from a UV-stable modified plastic. Preferably, the plastic of the protective body is moulded onto the corresponding sealing leg by means of a coextrusion method. This can advantageously increase the lifespan of the elastomer sealing profile when irradiated by sunlight.

In an alternative or optionally additional design, the plastic of the protective body has an increased abrasion resistance compared to the elastomer of the sealing leg. This is advantageous, for example, for geographical zones in which sand is also transported with the wind, which in turn usually has an abrasive effect. In addition, cleaning of the upper side of the panel, which is expedient for solar roofs, is less harmful to the elastomer of the elastomer sealing profile.

In a further expedient design, the labyrinth seal is formed in particular by two sealing lips projecting obliquely, in the pre-mounting state—i.e. without an inserted solar panel—, from the bearing side of the corresponding sealing leg, and by troughs formed under these in the bearing side. Herein, each of the troughs forms a labyrinth chamber. The sealing lips and the troughs are dimensioned in such a way that, in the intended mounting state of the sealing system, the sealing lips lie flush with one another and flat—i.e. in particular planar—on the solar panel. A major part of the corresponding trough is spanned in a web-like manner by the correspondingly associated sealing lip. The troughs or the labyrinth chambers formed by them, respectively, are preferably channels running transversely to the sealing direction (i.e. in the longitudinal direction of the elastomer sealing profile), which are bounded on the one hand by a foot of both sealing lips and on the other hand preferably by an rim-side lip and/or the protective body or a projection, respectively, which is located on the inner side of the respective sealing leg and which is located at the transition to the hinge section. As the sealing lips project obliquely from the bearing side of the sealing leg in the pre-assembled state, they exert a sealing force (thus an elastic restoring force) acting on the surface of the solar panel when the elastomer sealing profile is folded around the solar panel. As a result of the fact that the sealing lips span a major part of the respectively associated trough (the corresponding labyrinth chamber), the respective trough preferably forms a type of drainage channel, which, for example, can remain in the corresponding trough with only slight contact to the solar panel when rainwater enters the trough or can be drained off in this channel. As is recognized, the sealing effect is advantageously increased by two successive troughs or labyrinth chambers, respectively.

In a further expedient design, the other sealing leg (i.e. the one opposite the labyrinth seal in the intended mounting state) has a sealing surface provided with a plurality of notches running in the longitudinal direction of the elastomer sealing profile. As a result, a pressure force acting on this sealing leg in the direction of the solar panel in the intended mounting state is distributed over a large number of small contact points, so that these abut against the surface, in particular the lower side surface, of the solar panel with a correspondingly increased sealing pressure.

In a particularly preferred embodiment, the sealing system also has a mounting rail, preferably formed from a metal, for receiving an edge of the solar panel surrounded by the elastomer sealing profile. This mounting rail herein has a C-profile which forms a receiving slot (also: "receiving groove") for the elastomer sealing profile and for the solar panel. In addition, the mounting rail has a support rail arranged on a lower side of the C-profile facing away from the upper side of the panel in the intended mounting state. By means of this support rail, the mounting rail can be fastened to a sub-construction which serves for installing the solar panels, for example in the form of a solar roof, or is fastened in the intended deployment state. In this case, the sealing system thus serves not only for sealing the edge of the solar panel but also, in particular, in the form of a combined support and sealing system for retaining the solar panel or, if applicable, multiple solar panels.

Preferably, the C-profile is herein designed in such a way that the elastomer sealing profile is clamped against the solar panel when in the state inserted into the C-profile. Consequently, the receiving slot formed by the C-profile has an at least slight press fit for the (in particular folded) elastomer sealing profile placed around the solar panel. Due to the design of the elastomer sealing profile described above, in particular the design of both sealing legs, it is also possible in this case that, in particular with a sealing system (including the mounting rail) used on two opposite edges, a fixing of the solar panel going beyond the clamping described above can be omitted.

In a further expedient design, the mounting rail has a drip and guide tub which runs in the longitudinal direction (of the elastomer sealing profile) and serves for draining off dripping water which has passed between the elastomer sealing profile and the solar panel as well as for concealedly guiding connection cables of the solar panel. Thus, in the intended mounting state of the solar panel on the mounting rail, the connection cables, which are usually arranged in a corner region of the respective solar panel, are guided as directly as possible (i.e. in particular in a straight line) into this drip and guide tub and are linked there, for example, to a collective cable, which leads in particular to a transformer and/or an inverter. Since such cables are electrically insulated anyway, there is no need to guide these cables separately from any dripping water that may pass through.

In a further expedient design, which preferably serves for forming a roof surface from multiple solar panels arranged next to one another, the mounting rail has in particular a double C-profile having two oppositely aligned receiving slots for receiving, in particular on both sides, edges of solar panels surrounded with elastomer sealing profiles.

In a further expedient design, each base support element, at least each main support, but preferably also the framework elements, is made from aluminium, preferably each made from an aluminium profile. In particular, each base support element herein has a total weight of about 40 to 70 kilograms, especially about 50 to 65 kilograms. This advantageously enables a large-area solar roof arrangement to be installed by means of the solar roof system, for example, by only two people.

In a preferred design, the support elements of each base support element, thus at least the main support, and in particular also the framework elements, have a wall thickness of about 0.5 millimetres.

In a further preferred design, the main support has a bending radius of at least 2 metres, in particular of about 2.4 metres, in its bending region. This comparatively large bending radius advantageously enables a uniform introduction of force from the support leg over the bending region into the ground end, in particular into a second, straight support leg of the main support adjoining the bending region in the region of the ground end.

Each base support element preferably has a span width of at least about 5 metres—in particular when viewed along the bending plane. This span width is preferably measured over the length projected onto the horizontal line in the intended installed state of the respective base support element and thus extends from a "ridge-side" (i.e. highest in the intended installed state) end of the support leg to the ground end of the main support. The span width of the roof surface supported by the at least two base support elements arranged in parallel to one another, which preferably corresponds essentially (i.e. exactly or approximately) to that of the respective base support element, is thus particularly suitable for forming a carport for roofing a parking space of a standard passenger car. Optionally, each base support element has a span width of about 6 metres.

Preferably, the solar roof system, in particular the base support element, is calculated by means of a finite element method with regard to its required strength and stability for the dimensions described here and in the following.

In particular to support the use of the solar roof system as a carport, each base support element of the solar roof system preferably has a ridge height of at least 3, in particular of about 3.5 metres, preferably of about 4.2 metres, and an eaves height of at least 2.5, in particular of at least about 2.7 metres. The respective base support elements are preferably calculated in such a way that the eaves height can be increased to up to about 4.6 metres and the ridge height to about 5 or 6 metres, at least to 4.8 metres, in a simple manner by corresponding extension of the main support, in particular in the region of the base end, preferably of a second, in particular straight, support leg arranged there. A ridge height of more than 5 metres is particularly suitable for using the solar roof system as a hall.

Preferably, the solar roof system is at least designed and intended to be installed in geographical zones to which the wind load zone (also: "wind zone") 2 and preferably also the snow load zone 2 is associated. Optionally, the solar roof system is designed to be installed in the wind load zone 3 and/or in the snow load zone 3.

In a particularly preferred design, the solar roof system comprises at least two ground screws that serve to form the respective foundation for the at least two base support elements. Each of the two ground screws preferably has a length of about 2 metres. This allows the respective foundation to be formed comparatively easily and in a short time. In particular, it is not necessary to excavate a foundation pit, fill it with concrete and, in particular, to have a comparatively time-consuming hardening of the concrete in this case. Optionally, a preparation of the installation surface, e.g. levelling, compacting or the like, can also be omitted. In case that the solar roof system is to be installed on an already paved, tarred, or concreted installation surface, for example, an opening in the underground (i.e. the tar, pavement, or concrete layer, for example) with a diameter slightly larger than the diameter of the ground screw is optionally sufficient. Advantageously, a ground screw can also be screwed in at this length in about 10 minutes with an appropriate mounting device and preferably immediately exhibits its intended stability. The solar roof system thus preferably comprises at least these two ground screws as foundation.

In a further preferred design, the foundation adapter has a base plate for fastening to the foundation, preferably to the respective ground screw, and a standpipe connected to this base plate. Preferably, the base plate is screwed to the foundation, specifically to the ground screw (in particular by means of six screws). During the mounting of the solar roof system, the ground end of the respective main support is slipped onto and fixed to the standpipe. Thus, in the solar roof system, the ground end of the respective main support is slipped (or pushed) onto the standpipe and preferably fixed to the respective standpipe by means of at least two screws.

In an expedient variant of the solar roof system, the latter has a mounting sleeve which serves in particular for aligning (in particular levelling) the ground ends of the respective main supports with respect to the foundation adapter and the other main supports. This mounting sleeve is preferably formed by two half-shells that are placed around the ground ends of the respective main support and fastened to it, in particular by means of clamping. Beforehand or optionally afterwards, the ground end of the respective main support is aligned in its height to the ground ends of the other main supports (e.g. by means of spacers pushed between the ground end and the base plate), so that the ground ends are preferably all arranged in a common horizontal plane. Subsequently, the respective base end of the main support is screwed to the standpipe of the foundation adapter through two holes of the respective mounting sleeve forming a drilling template.

In a design, the solar roof system has at least four base support elements and a second roof surface. Two of the base support elements each herein are coupled to one another with their support legs pointing away from one another and by means of at least two of the at least three framework elements each. This means that these base support elements are connected to one another at their rears, in particular in the bending region of the main support, by means of at least two of the three framework elements. Two of these four base support elements each, in particular the two parallel base support elements with their support legs pointing in the same direction, each support one of the two roof surfaces each. The two base support elements, which are arranged against one another at their rears and connected to one another, are thus secured against one another. Both roof surfaces also meet one another at their respective eaves, resulting in a butterfly roof or "Y-roof". This arrangement is preferably used for a carport, where a parking space for a vehicle is arranged under each roof surface, preferably with opposite parking direction. Here, the transverse support provided for two base support elements can also be "shared" by the other base support elements connected to the rear of these.

In particular in the butterfly roof design, the two base support elements arranged with their rears to one another are also preferably fastened to one another and in particular to the foundation, specifically the foundation adapter, with exactly seven screws. In particular, each main support is fastened to the respective foundation adapter with two screws each. By means of the further three screws, in particular the framework elements are fastened to one another and/or to the main support. In particular, the framework elements of both base support elements running in parallel to the support leg are connected to one another in the region of the eaves by means of a screw. Preferably, a rain gutter is also integrated between the two base support elements by means of this screw. The use of only seven screws makes the solar roof system particularly easy to install and, in particular, requires little mounting time.

In an alternative design, the solar roof system has four base support elements and also the second roof surface, wherein however two base support elements each are supported against one another on the ridge side, i.e. with the respective support legs pointing towards one another at their free end. In this case, too, the base support elements pointing in the same direction each support one of the roof surfaces. This installation thus results in a so-called saddle roof. Furthermore, this installation is preferably used for a hall, for example a warehouse, a greenhouse, or the like.

In an optional design, the butterfly roof described above and the saddle roof are combined with one another, so that, for example, a hall with a saddle roof with an adjoining carport with a monopitch roof results.

In a further design, which can be used for all roof variants (in particular at least for butterfly roof and saddle roof), the solar roof system has in particular at least six base support elements, whereby three base support elements each are arranged in parallel to one another and with their support legs pointing in the same direction. In the case of the butterfly roof, this results in a total of four carport parking spaces, namely one each between two base support elements oriented in the same direction.

In an optional design, the solar roof system comprises one (or more) adapters for increasing the span width, especially in the case of a saddle roof. In the installed state, this adapter preferably bridges a distance between the ridge ends of the two opposing base support elements. In this way, the (total) span width of the solar roof arrangement formed by the solar roof system can be increased from a total of 10, e.g., to 13 to about 17 metres.

In the butterfly roof design, the three framework elements of a base support element are preferably coupled to the corresponding three framework elements of the base support element connected at the rear.

In the saddle roof design, the three framework elements are preferably aligned in the same way as in the arrangement for the butterfly roof, but secured towards the ground by means of a fourth framework element, which is preferably arranged vertically. Preferably, this fourth framework element is coupled to the main support and/or to the foundation adapter in the region of the ground end and thus (indirectly or directly) connected to the ground. Optionally, the fourth framework element is anchored in the ground by means of a further, separately associated foundation adapter. This fourth framework element thus depicts in particular a type of "tie rod". Preferably, in the design of the solar roof system with saddle roof, the fourth framework element is designed as a U-profile and in particular also serves as a mounting profile for further attachment parts. Due to the design as a U-profile, the fourth framework element can also be easily connected to the main support, in particular by this one partially embracing the main support.

In case that the solar roof system has a monopitch roof, the fourth framework element described above is also provided in a particularly stable design, formed as a hollow profile (in particular as a round tube, preferably the same hollow profile as that of the main support). In particular, the fourth framework element is connected to the ground by means of a separately associated foundation adapter. Optionally, the same foundation is used as for the associated base support element—in this case, e.g., a concrete foundation or a correspondingly enlarged ground screw. Alternatively, the foundation adapter separately associated with the fourth framework element is anchored in the ground by a separate ground screw. In an optional variant, the main support and the fourth framework element are jointly anchored in the ground by means of an adapted foundation adapter, wherein this foundation adapter has two standpipes, one of which is configured for receiving the main support and the other for receiving the fourth framework element.

In an optional equipment variant, the solar roof system has an inverter and/or a transformer for the electricity generated by the solar panels, so that the solar roof system forms a photovoltaic system in particular. Alternatively or preferably additionally, the solar roof system also has a charging station for an electric vehicle. This charging station is optionally coupled with the inverter or transformer, respectively. Preferably, the inverter, the transformer and/or the charging station is arranged at a height of about 1.7 metres. Optionally, the solar roof system also has a heat pump or a coupling point to such a heat pump.

In a further optional equipment variant, the solar roof system has side walls which are arranged in particular in parallel to the bending plane of the respective main support of the base support elements bounding the solar roof system on the outside. The side walls are formed, e.g., from a profiled and/or perforated sheet or an at least partially transparent material, e.g., glass or a plastic, for example PMMA or PC. Optionally, the solar roof system also has a front gate (in addition or as an alternative to the side walls), which is arranged to run transversely to the bending plane and thus preferably forms a closed interior space in combination with the side walls and the roof surfaces. The front door is optionally designed as a rolling, lifting, or wing door. The solar roof system also optionally has intermediate walls, in particular designed to be comparable to the side walls, for subdividing the roofed area. For example, in this equipment variant, the fourth framework elements described above serve for fastening the side walls and/or the front gates.

Preferably, the solar panels used are at least partially transparent photovoltaic modules.

The conjunction "and/or" is to be understood here and in the following in particular in such a way that the features linked by means of this conjunction can be designed both together and as alternatives to one another.

BRIEF DESCRIPTION OF THE DRAWINGS

In the following, example embodiments of the invention are illustrated in more detail by means of a drawing. Shown to scale are.

Parts corresponding to one another are always marked with the same reference signs in all figures.

DETAILED DESCRIPTION OF THE PREFERRED EMBODIMENTS

Figure 1:
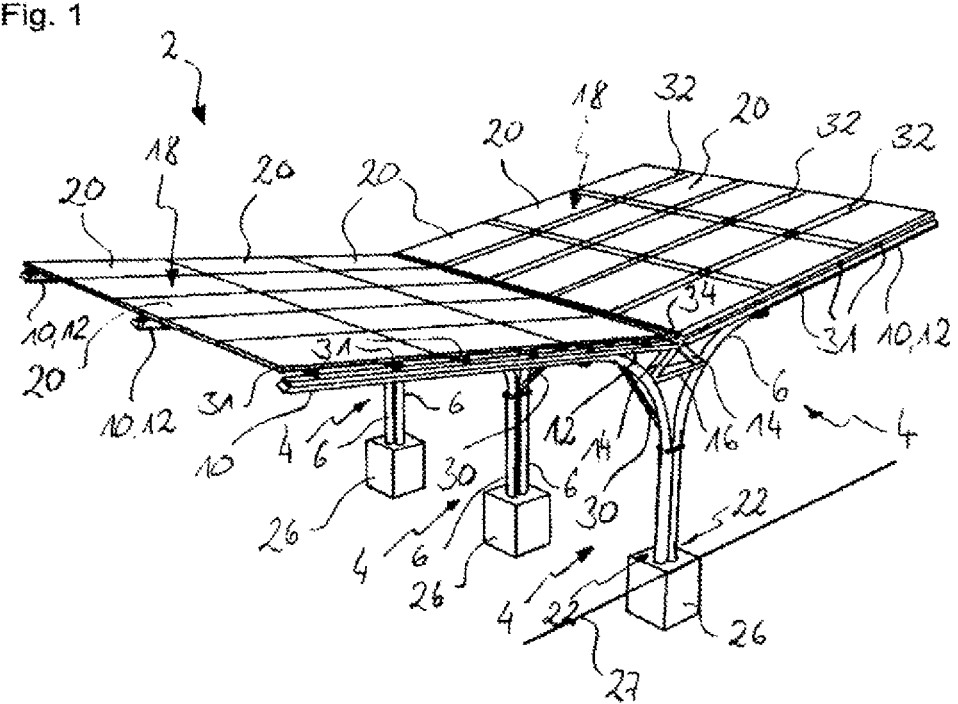
FIG. 1 a schematic perspective view of a design of the solar roof system in the form of a carport, FIG. 2, 3 in a schematic side view, the solar roof system, in a partially installed state, in particular without roof surfaces, each in a different arrangement, FIG. 4 in a schematic side view, a foundation adapter of the solar roof system, FIG. 5 in a schematic sectional view, a seal for sealing solar panels of the solar roof system to one another, FIG. 6 in a schematic sectional view, a support and sealing rail for sealing and retaining the solar panels, and FIG. 7 in a schematic cross-sectional view, an elastomer sealing profile of a sealing system of the solar roof system.

In FIG. 1, the solar roof system 2 which forms a carport is schematically depicted. The solar roof system 2 is mounted as a construction kit described in more detail below. In the example embodiment shown, the solar roof system 2 comprises six base support elements 4. These in turn have a main support 6 formed from a round aluminium tube, i.e. a closed hollow profile. The main support 6 is bent by an angle of 100 degrees in a bending region 8 (see FIG. 2). A support leg 10 of the main support 6 adjoining the bending region 8 is thus deflected by 80 degrees from a vertical line 11 in the depicted installation state. The base support elements 4 also have three framework elements 12, 14 and 16, which serve on a bend outer side 17 of the bending region 8 to specifically secure the support leg 10. The framework element 12 runs in parallel to the support leg 10 over its entire length and specifically overhangs the bend outer side 17 of the bending region 8. The framework element 12 forms a support for a roof surface 18 of the solar roof system 1. The roof surface 18 comprises fifteen solar panels 20 in the example embodiment shown. The respective base support elements 4 are each placed with a base end 22 of the respective main support 6 on a foundation adapter 24 (shown in more detail in FIG. 4) and connected to the latter. The foundation adapter 24 is in turn connected to a foundation 26. In the example embodiment shown in FIGS. 1-3, the foundation 26 is formed by a conventional concrete foundation.

In an example embodiment not shown in more detail, the foundation 26 is formed by a ground screw screwed into the ground, the surface of which is indicated by a level line 27 exemplary of the ground level.

Figure 2:
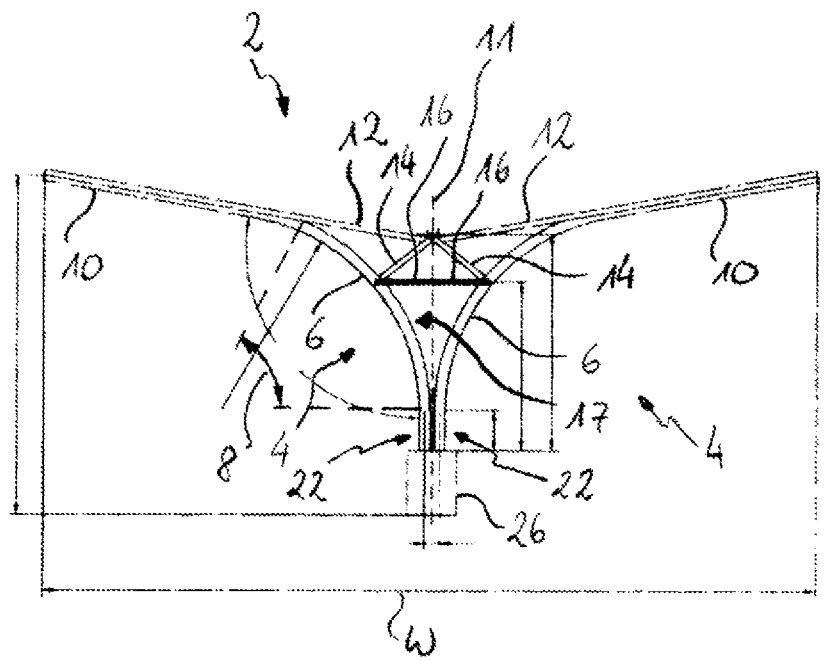

In the example embodiment depicted in FIG. 1, the solar roof system 2 specifically has two roof surfaces 18, each being supported by three base support elements 4. The two (first and second) roof surfaces 18 herein form a butterfly roof. I.e., the two roof surfaces 18 meet at the so-called eaves. Thus, three base support elements 4 each are arranged with their support legs 10 pointing in the same direction and pointing away from the support legs 10 of the other three base support elements 4. The ridge of both roof surfaces 18 is thus located on an outer or front side of the base support elements 4 and thus of the solar roof system 1. On the bend outer side 17 of the main supports 6 of the respective base support elements 4, the framework elements 12, 14 and 16 of the base support elements 4, which are each arranged against one another (on their rears), are coupled to one another. As a result, in particular the respective support leg 10 of these two base support elements 4 is secured against the respective other base support element 4. The framework elements 12, 14 and 16 of these two base support elements 4 together form multiple "force triangles". In FIG. 2, the solar roof system 2 is depicted without both roof surfaces 18.

For further stabilisation of the solar roof system 2, the base support elements 4 adjacent to one another transversely to the bending plane of the respective main support 6 are braced together by means of two transverse supports 30.

For retaining the respective roof surface 18, the solar roof system 2 has multiple mounting rails 31 (also referred to as "mounting profile" or "support rail") fastened to the framework elements 12 and running transversely to them. The individual solar panels 20 are retained together in the direction of the framework elements 12 by means of the support and sealing rails 32 depicted in FIG. 6 and fastened to the mounting rails 31. Transverse to the direction of the framework elements 12, the individual solar panels 20 are sealed against one another with the interposition of a rubber seal 33 depicted in more detail in FIG. 5.

In order to prevent rainwater from dripping down, in particular in the range of the eaves, the solar roof system 2 has a rain gutter 34 which is supported below both roof surfaces 18, running transversely to the direction of the framework elements 12, by the framework elements 12 and 14.

Figure 3:
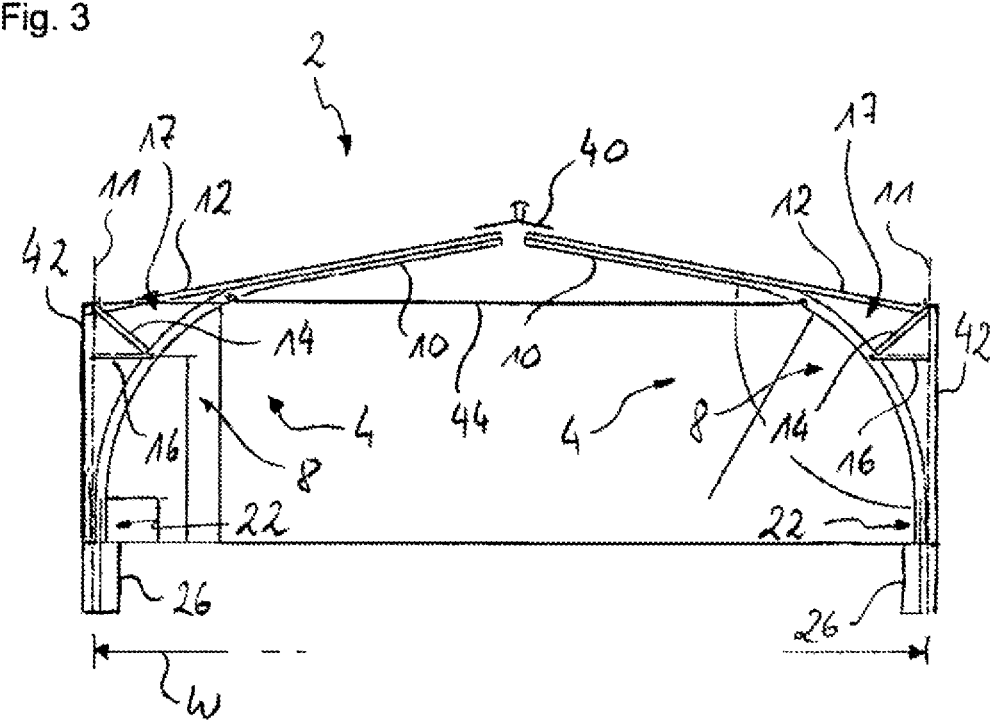

In FIG. 3, an alternative example embodiment of the solar roof system 2 is depicted. For simplification, the roof surfaces 18 and the mounting rails 31 are not depicted here. In this example embodiment, the base support elements 4 are positioned with their support legs 10 pointing towards one another. I.e., the base support elements 4 meet with their respective ridge ends, so that the roof surfaces 18 supported by the mounting rails 12 form a saddle roof. In this case, the solar roof system 2 comprises a ridge seal 40. For purposes of securing, the base support elements 4 also each have a fourth framework element 42 which is arranged along the vertical line 11 and serves for securing the support leg 10 towards the ground by means of the framework elements 12, 14 and 16. In addition, the solar roof system 2 also has a tension strut 44 that connects the two base support elements 4 which are installed opposite to one another and meet at their respective ridge end. Two base support elements 4 each installed in parallel next to one another are also connected to one another here by means of the transverse support 30.

The fourth framework element 42 in this example embodiment is formed as a U-profile and also serves as a mounting profile for an eaves-side wall or the like.

Figure 4:
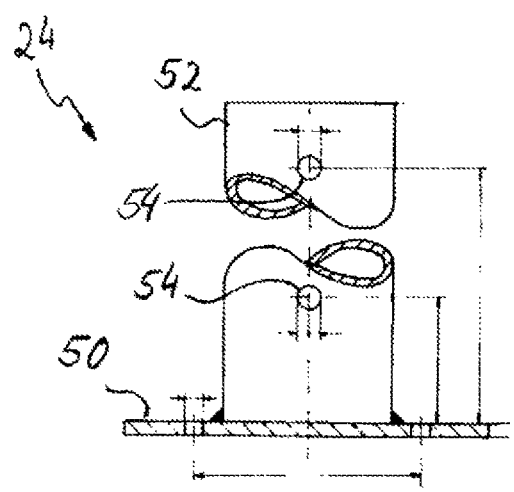

In both example embodiments according to FIGS. 2 and 4, the base supports 4 have a span width of 5 metres, so that a total span width W of the solar roof system 2 is 10 metres. A distance between the base support elements 4 arranged in parallel (i.e. seen transversely to the support leg 10) is 2.5 metres in the present example embodiment.

In an optional example embodiment, the distance between the base support elements 4 arranged in parallel is three metres.

In FIG. 4, the foundation adapter 24 is depicted in more detail. This has a base plate 50 which serves for connecting to a head of the ground screw described above. In addition, the foundation adapter 24 has a standpipe 52, which is arranged normal to the base plate 50 and welded to it. Specifically, the standpipe 52 has a length of 500 millimetres. Accordingly, each main support 6 is also provided in the region of the base end 22 with a straight second (end-side) support leg arranged there. In the intended mounting state according to one of the FIGS. 1-3, the respective ground end 22 of the main support 6 is slipped onto the standpipe 52 and thus covers it.

For mounting, specifically for levelling (i.e. adjusting the height) of all base support elements 4 in relation to one another, the solar roof system 2 comprises a mounting sleeve (not depicted in more detail), which forms a drilling template for forming fastening holes in the base ends 22 or the second support legs, respectively, of the each main support 6. For mounting, the respective base end 22 is first aligned in its height relative to the base plate 50 of the foundation adapter 24, in particular by means of spacers. Subsequently, the mounting sleeve (also called "quick mounting device") is placed around the base end 22 of the respective main support 6 with contact to the base plate 50. The mounting collar has markings by means of which it can be unambiguously aligned in its rotational position around the standpipe 52. By means of the mounting sleeve, drilling points are then marked on the main support 6, which, due to the arrangement of the mounting sleeve in relation to the foundation adapter 24 described above, coincide with predetermined, specifically already existing drill holes 54 in the standpipe 52. The fastening drill holes are subsequently formed in the base ends 22 and the respective main support 6 is screwed to the standpipe 52. Specifically, two screws are used for each main support 6 for connection with the respective standpipe 52.

In the example embodiment according to FIGS. 1 and 2 (i.e. when installed as butterfly roof), each base support element 4 is thus connected to the respective foundation adapter 24 with two screws. Both framework elements 12 of both base support elements 4 standing against one another at their rears as well as the rain gutter 34 are in turn connected to one another with a screw ("central screw"). The framework elements 14 and 16 are fastened to both main supports 6 of both base support elements 4 standing against one another at their rears by means of two further screws. This results in the two base support elements 4 standing against one another at their rears being fixed to one another and to the base adapters 24 by means of a total of seven screws.

Figure 5:
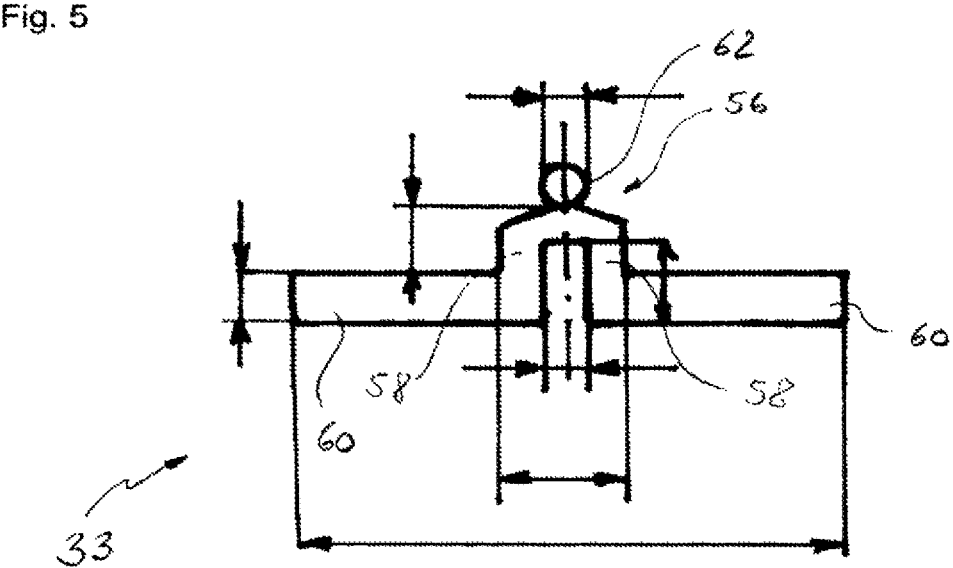

In FIG. 5, the rubber seal 33 is depicted, which is arranged between the individual solar panels 20 and is running transversely to the direction of the support legs 10. The rubber seal 33 has an approximately U- or V-shaped central section 56 which lies in a gap between the solar panels 20. Legs 58 of this central section 56 are adjoined by bearing wings 60, which abut against the lower side of the solar panels 20. Due to the roof pitch of the respective roof surface 18, the solar panels 20 "slide" towards the eaves and thus jam the central section 56 in the gap. During this, the legs 58 are pressed against one another. Furthermore, a sealing contour 62, which also lies in the gap, is moulded onto the upper side of the central section 56. In an optional variant, the gap is closed on the upper side with a sealing adhesive to form a surface that is as smooth as possible.

Figure 6:
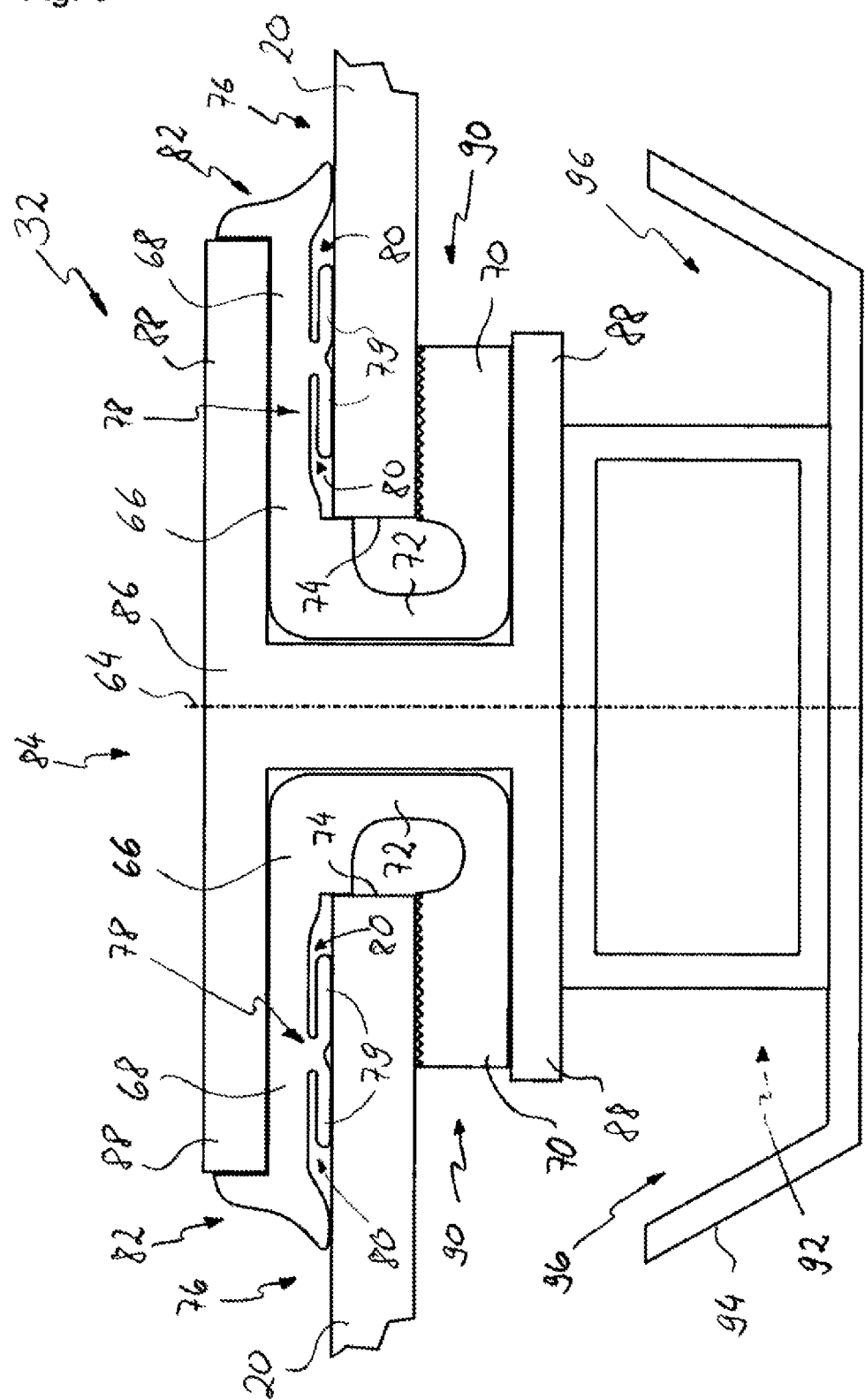

In FIG. 6, an example embodiment of the support and sealing rail 32, which serves for retaining and connecting two solar panels 20 arranged adjacent to one another and transversely to the direction of the framework elements 12, is depicted in more detail. For this purpose, the support and sealing rail 32 is designed symmetrically to a symmetry plane 64 (aligned in parallel to the direction of the framework elements 12 in the intended mounting state of the solar roof system 2).

The support and sealing rail 32 has a sealing profile 66 on both sides of the symmetry plane 64. This is elongated into the sheet plane (thus in the direction of the framework elements 12). The sealing profile 44 has a first sealing leg 68 and a second sealing leg 70, which are elastically coupled to one another via a hinge section 72 in a pivotable manner. Both sealing legs 68 and 70 as well as the hinge section 72 are monolithically formed from an elastomer, specifically a rubber. In the depicted mounting state, both sealing legs 68 and 70 are arranged in parallel to one another and embrace an edge 74 of one of the solar panels 20. In a pre-mounting state not depicted in greater detail, however, both sealing legs 68 and 70 are standing obliquely apart.

In the intended mounting state, the first sealing leg 68 is arranged on an upper side 76, facing the sun, of the respective solar panel 20. The first sealing leg 68 has a labyrinth seal 78 on a bearing side facing the upper side 76 of the respective solar panel 20. By this, multiple troughs 80 are formed in the first sealing leg 68, succeeding one another from the outer rim in the direction of the edge 74, which troughs 80 run along the longitudinal extension of the sealing profile 66 and in which any liquid which has penetrated can drain off due to the inclination of the roof surface 18.

At its outer rim, the first sealing leg 68 also has a sealing rim 82 which rests on the upper side 76 of the respective solar panel 20 while exerting a sealing force.

The support and sealing rail 32 further also comprises a mounting rail 84. This mounting rail 84 comprises a double C-profile 86. Both C-legs 88 of each C-shaped part of the double C-profile 86 form a receiving groove 90 for the sealing profile 66 and the solar panel 20 received therein. In the depicted intended mounting state, the sealing profile 66 is thus folded around the respective solar panel 20 and inserted into the receiving groove 90. The sealing profile 66 is herein clamped against the solar panel 20 by the C-legs 88. Since each solar panel 20 is received in a support and sealing rail 32 on both sides transversely to the direction of the framework elements 12, any additional fastening of the solar panels 20, for example by means of screws, can be omitted since the frictional force applied by the sealing profiles 66 is sufficiently high for retaining the solar panels 20 in place.

Since the sealing rim 82 projects from the receiving groove 90, it is coated with a UV-resistant plastic or formed from such a plastic.

The mounting rail 84 further comprises a support rail 92 on which the double C-profile 86 is mounted. Also mounted to the support rail 92 is a drip and guide tub 94, which forms a drainage channel 96 for fluid passing between the sealing profile 66 and the respective solar panel 20. In addition, connection cables of the solar panels 20 retained by means of the support and sealing rail 32 are concealedly guided in the drainage channel 96.

The mounting rail 84 is placed on the mounting rails 31 of the solar roof system 2 and fastened to them.

In an alternative example embodiment for retaining and sealing the solar panels 20 in a rim-closing manner, which is not depicted in more detail, the support and sealing rail 32 has only one of the "halves" formed by the symmetry plane 64. I.e., the support and sealing rail 32 has only one receiving groove 90 formed by the C-legs 88 (thus only a "simple" C-profile) and a sealing profile 66.

The subject matter of the invention is not limited to the example embodiments described above. Rather, further embodiments of the invention can be derived from the above description by the person skilled in the art. In particular, the individual features of the invention described by means of the various example embodiments and their design variants can also be combined with one another in other ways.

Figure 7:
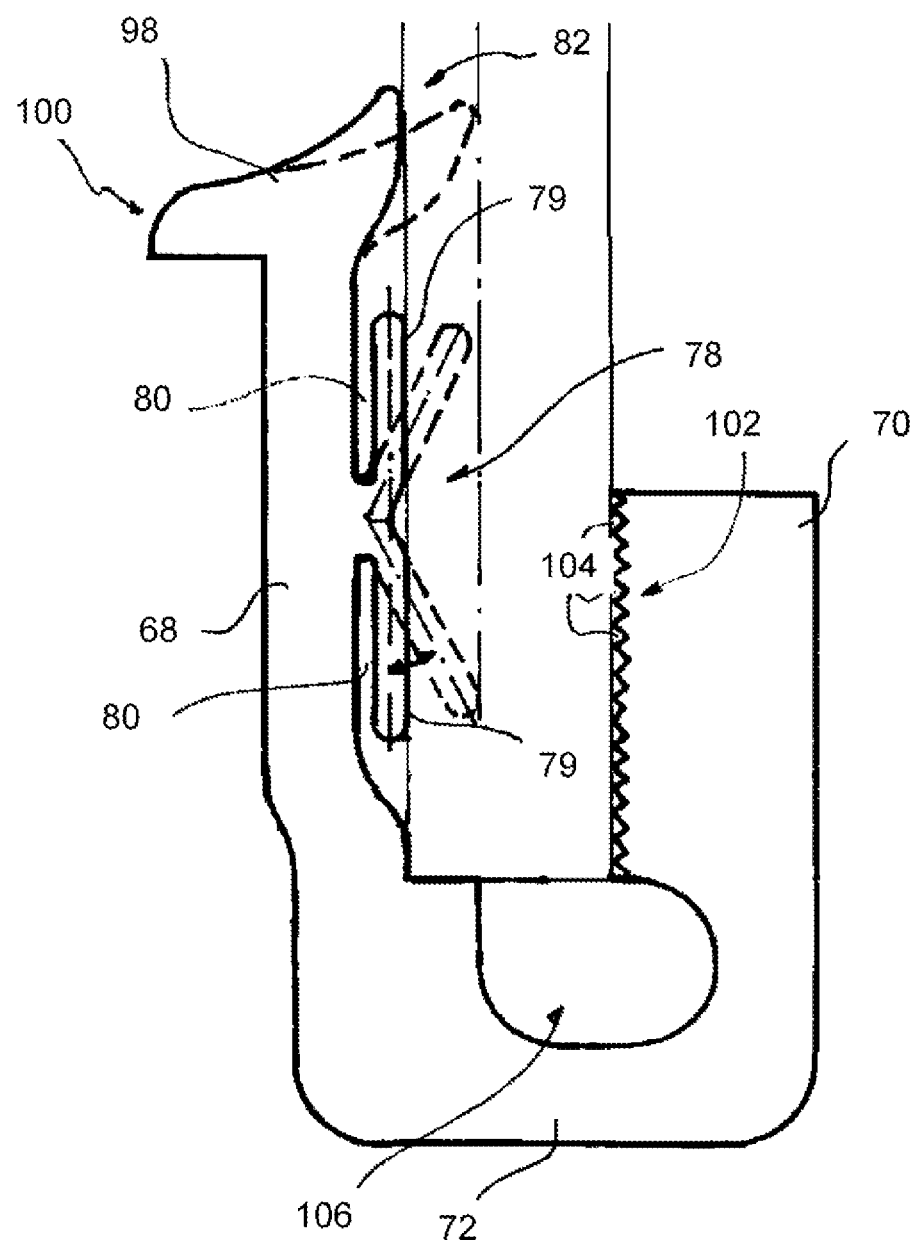

In FIG. 7, a schematic sectional representation of an elastomer sealing profile is depicted in more detail. The elastomer sealing profile has a first sealing leg 68 and a second sealing leg 70. The first and the second sealing legs 68 and 70 are elastically coupled to one another via the hinge section 72 in a pivotable manner. Both sealing legs 68 and 70 as well as the hinge section 72 are herein monolithically formed from an elastomer, specifically a rubber. Both sealing legs 68 and 70 are arranged in parallel to one another in an intended mounting state depicted in FIG. 6 and embrace an edge 74 of one of the solar panels 20. In a pre-mounting state not depicted in more detail, however, both sealing legs 68 and 70 are standing obliquely apart.

In the intended mounting state, the first sealing leg 68 is arranged on an upper side 76, facing the sun, of the respective solar panel 20, whereas the second sealing leg 70 is arranged on the lower side of the respective solar panel 20 in the intended mounting state.

The first sealing leg 68 has the labyrinth seal 78 on a bearing side facing the upper side 76 of the respective solar panel 20. The labyrinth seal 78 is herein formed by two elongated sealing lips 79, each of which spans a trough 80 formed in the bearing side. The sealing lips 79 are herein designed in such a way that in the pre-mounting state they project from the bearing side in a V-shaped manner (indicated in FIG. 7 by a dashed line). In the intended mounting state, on the other hand, the sealing lips 79 are pressed back from the upper side 76 of the respective solar panel 20 and then lie flush with one another and planar on the upper side 76 (compare FIG. 6).

At its outer rim, the first sealing leg 68 also has the sealing rim 82, which is also pressed back from the upper side 76 of the solar panel 20 in the intended mounting state (cf. dash line). The sealing lips 79 and the sealing rim 82 thus exert a sealing force on the upper side 76 of the solar panel 20.

On its side facing the lower side of the solar panel 20, the second sealing leg 70 has the sealing surface 102, which is formed by a plurality of notches 104 running in the longitudinal direction.

Since the sealing system in the example embodiment according to FIG. 7 runs along the direction of inclination of the solar roof system, the troughs 80 as well as a chamber 106 formed between the sealing legs 68 and 70 and the hinge region 72 each form drainage channels for water which penetrates through up to them despite sealing.

LIST OF REFERENCE NUMERALS 2 solar roof system
4 base support element
6 main support
8 bending region
10 support leg
11 vertical line
12 framework element
14 framework element
16 framework element
17 bend outer side
18 roof surface
22 solar panel
22 ground end
24 foundation adapter
26 foundation
27 level line
30 transverse support
31 mounting rail
32 support and sealing rail
33 rubber seal
34 rain gutter
40 ridge seal
42 framework element
44 tension strut
50 base plate
52 standpipe
54 hole
56 central section 58 leg
60 bearing wing
62 sealing contour
64 symmetry plane
66 sealing profile
68 sealing leg
70 sealing leg
72 hinge section
74 edge
76 upper side
78 labyrinth seal
79 sealing lip
80 trough
82 sealing rim
84 mounting rail
86 double C-profile
88 C-leg
90 receiving groove
92 support rail
94 drip and guide tub
96 drainage channel
98 protective body
100 heel
102 sealing surface
104 notch
106 chamber
W total span width

The invention claimed is:

1. A solar roof system, having
a roof surface comprising a predetermined number of solar panels, and
at least two base support elements for retaining the roof surface, wherein each base support element has a main support which is formed from a closed hollow profile, which is bent within a bending plane in a bending region by less than 90 degrees and more than 60 degrees, and which has at least one straight support leg adjoining the bending region and on which the roof surface is borne,
characterised in that the solar roof system further has:
at least three framework elements by means of which the support leg is secured on a bend outer side of the bending region in the intended installed state of the solar roof system,
at least two foundation adapters associated with the base support elements for fastening the base support elements to a foundation, and
a support and sealing rail for retaining and for sealingly connecting the solar panels, said solar panels having edges which lie next to one another in parallel to the bending plane, and for guiding connection cables of the solar panels,
wherein the solar roof system further comprises a sealing system with an elongated elastomer sealing profile for sealing edges of said solar panels against an attachment part, wherein the sealing system has two sealing legs which extend transversely with respect to a longitudinal direction of the elastomer sealing profile and are integrally connected to one another via a hinge section, which are arranged essentially in parallel to one another in an intended mounted state in order to embrace edges of the solar panels and abut against solar panels on top and bottom sides, and which are standing at least V-shaped with respect to one another in a pre-mounted state,
wherein a labyrinth seal with at least one trough is formed on at least one of said two sealing legs on a bearing side towards the solar panels,
wherein the labyrinth seal is formed by two sealing lips projecting obliquely, in the pre-mounted state, from the bearing side of the sealing legs, and by troughs formed these in the bearing side,
wherein the sealing lips and the troughs being dimensioned in such a way that, in the intended mounted state, the sealing lips lie flush with one another and flat on the solar panels and span a major part of the corresponding trough in a web-like manner.

2. The solar roof system according to claim 1, characterised in that it has a transverse support for coupling of two respective base support elements of the at least two base support elements installed in parallel transversely to the bending plane of the respective main support.

3. The solar roof system according to claim 1, characterised in that one of the framework elements is arranged in parallel to the support leg and forms a support for the roof surface, wherein this framework element rests on the support leg and overhangs the bending region.

4. The solar roof system according to claim 1, characterised in that each base support element is formed from aluminium and has a total weight of 40 to 70 kg.

5. The solar roof system according to claim 1, characterised in that the main support has a bending radius of at least 2 metres in the bending region.

6. The solar roof system according to claim 1, characterised in that each base support element has a span width of less than 6 metres.

7. The solar roof system according to claim 1, characterised in that each base support element has a ridge height of at least 3 metres and an eaves height of at least 2.5 metres.

8. The solar roof system according to claim 1, characterised in that it comprises at least two ground screws of about 2 metres in length for forming the foundation for the at least two base support elements.

9. The solar roof system according to claim 1, characterised in that each of the at least two foundation adapters has a base plate for fastening to the foundation and a standpipe which is connected thereto and onto which, in the intended installed state of the solar roof system, a ground end of the main support facing away from the respective support leg is slipped and fixed.

10. The solar roof system according to claim 1, characterised in that
the at least two base support elements are arranged in parallel to one another with the bending plane of the respective main supports,
each of the support legs is arranged at an angle of at most 30 degrees to a horizontal line, and
the respective main support having a ground end which is fastened to a foundation by means of one of the foundation adapters.

11. The solar roof system according to claim 1, characterised in that the at least two base support elements comprise at least four base support elements and that the solar roof system comprises two roof surfaces, wherein two of said at least four base support elements each are coupled to one another with their support legs pointing away from one another and by means of at least two of the at least three framework elements each, and wherein two of the at least four base support elements each support one of the roof surfaces each.

12. The solar roof system according to claim 1, characterised in that said solar roof system comprises at least four of said base support elements and two of said roof surfaces, wherein two of the four base support elements each are supported against one another with the respective support legs pointing towards one another at their free ends, and wherein two base support elements each support one of the roof surfaces each.

13. The solar roof system according to claim 12, characterised in that each of the support legs is secured to the ground by means of the at least three framework elements.

14. The solar roof system according to claim 1, characterised in that the support and sealing rail has a drip and guide tub running in a longitudinal direction, which serves for draining off dripping water and for concealedly guiding the connection cables.

* * * * *